United States Patent
Courtemanche

(12) 
(10) Patent No.: US 6,422,665 B1
(45) Date of Patent: Jul. 23, 2002

(54) SNOWMOBILE TRACK WITH HEAT TRANSFER CLIPS

(75) Inventor: Denis Courtemanche, Richmond (CA)

(73) Assignee: Camoplast, Inc. (CA)

(*) Notice: Subject to any disclaimer, the term of this patent is extended or adjusted under 35 U.S.C. 154(b) by 0 days.

(21) Appl. No.: 09/713,685

(22) Filed: Nov. 15, 2000

(30) Foreign Application Priority Data

Nov. 16, 1999 (CA) .............................................. 2289805

(51) Int. Cl.[7] .............................................. B62D 55/24
(52) U.S. Cl. ...................................... 305/168; 305/167
(58) Field of Search .............................. 305/168, 165, 305/167, 127

(56) References Cited

U.S. PATENT DOCUMENTS

| | | | | |
|---|---|---|---|---|
| 3,690,741 A | * | 9/1972 | Pierson | 305/168 |
| 4,474,414 A | * | 10/1984 | Tokue | 305/168 |
| 4,560,211 A | * | 12/1985 | Van Der Lely | 305/168 |
| 4,758,055 A | | 7/1988 | Anderson | |
| 4,991,911 A | * | 2/1991 | Blais | 305/168 |
| 5,415,470 A | * | 5/1995 | Courtemanche | 305/168 |
| 5,573,316 A | | 11/1996 | Wankowski | |
| 5,676,437 A | * | 10/1997 | Holmgren et al. | 305/165 |
| 5,685,621 A | | 11/1997 | Nugent | |
| 5,713,645 A | * | 2/1998 | Thompson et al. | 305/168 |
| 5,755,495 A | * | 5/1998 | Cook et al. | 305/168 |
| 5,814,167 A | * | 9/1998 | Beaudoin | 305/168 |
| 5,921,642 A | | 7/1999 | Tschida | |

* cited by examiner

Primary Examiner—S. Joseph Morano
Assistant Examiner—Long Bao Nguyen
(74) Attorney, Agent, or Firm—Akerman Senterfitt

(57) ABSTRACT

The present invention concerns the provision of metallic clips mounted on the endless track of a snowmobile equipped with one or more elongated slide runners forming part of its suspension system. The clips are so formed that a first portion thereof is slidably and frictionally contacted by the slide runners during rotation of the track with a second portion thereof extending slightly above profiles integrally formed on the outer surface of the track so that the heat generated by the sliding friction of the slide runners on the clips is transferred directly to the ground, such as snow or ice, over which the snowmobile travels.

3 Claims, 2 Drawing Sheets

SNOWMOBILE TRACK WITH HEAT TRANSFER CLIPS

FIELD OF THE INVENTION

The present invention pertains to an endless track for use on a snowmobile equipped with a suspension system having elongated slide runners which bear on the inner face of the lower run of the snowmobile track. More particularly, the present invention relates to such tracks having metallic clips that provide bearing contact for the slide runners on the track.

BACKGROUND OF THE INVENTION

At present, many snowmobile tracks are equipped with metallic clips which are located in one or more rows of longitudinally spaced holes provided along the endless track. The purpose of these clips is to provide a sliding surface for the slide runners that bear on the inner face of the lower run on the track. The highly rotational drive of the track causes extreme heat to the generated on the contacting surfaces of the slide runners and of the clips. This heat is transferred to the rubber material of the track to which the metallic elements are clipped, greatly affecting its structure. In some cases, the heat will cause the runners to be bound to the clips.

In tracks having rows of holes, there is some cooling effect obtained by the presence of snow or ice in these holes into which extend opposite wing portions of the clips. However, this has been found to be greatly insufficient and the above described heat problems still exist.

OBJECTS AND STATEMENT OF THE INVENTION

It is an object of the present invention to provide on an endless track of a snowmobile of the kind having slide runners forming part of the suspension system, a series of metallic clips which establish a direct contact between the slide runners and the ground over which the snowmobile travels so that heat generated by the sliding friction of the slide runners on the metallic clips may be thermally transferred directly to the ground which, of course, is at a much lower temperature than that of the heat generated by the sliding friction.

The present invention therefore relates to a track for use on a snowmobile having a suspension system equipped with one or more elongated slide runners, the track comprising an endless body having an outer surface with transverse rows of ground engaging profiles, spaced longitudinally of the track, and an inner surface adapted to receive, on the lower run thereof, the slide runners of the suspension system. The track includes one or more rows of longitudinally spaced metal clips that are secured to the body of the track; each clip has a first portion extending substantially in the plane of the inner surface of the track and so disposed thereon as to be frictionally contacted by a slide runner, and a second portion extending above the outer surface of the track so as to contact the ground over which the snowmobile travels whereby heat generated by the sliding contact of the slide runner on the first portion of the clip is thermally transferred to the ground, being at a temperature lower than that of the heat generated by the sliding friction of the slide runners on the clips.

In one form of the invention, the second portion of the clip has pointed ends that extend outwardly beyond the plane extending through the upper edges of the profiles of the track.

In another form of the invention, the metallic clips are elements clipped to the track.

In another form of the invention the metallic clips are elements integrally formed with the body of the track.

Other objects and further scope of the present application will become apparent from the detailed description given hereunder.

DESCRIPTION OF THE PREFERRED EMBODIMENT

Figure 1:
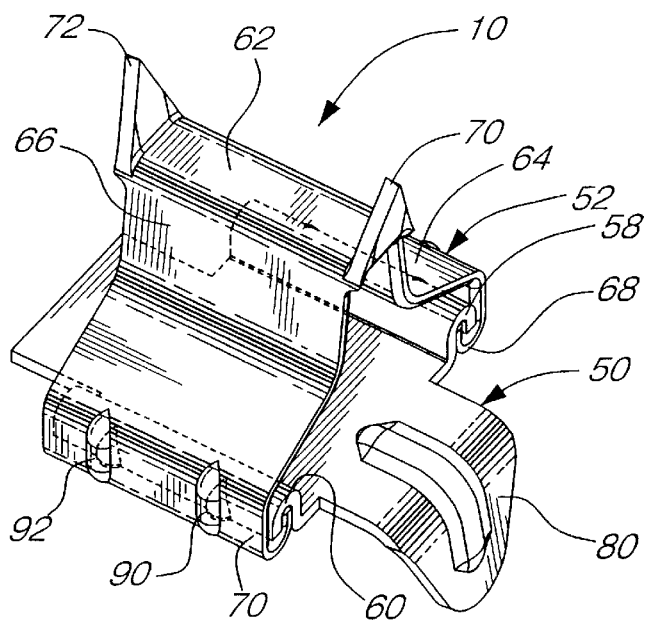
FIG. 1 is a perspective view of a clip made in accordance with the present invention.
Figure 2:
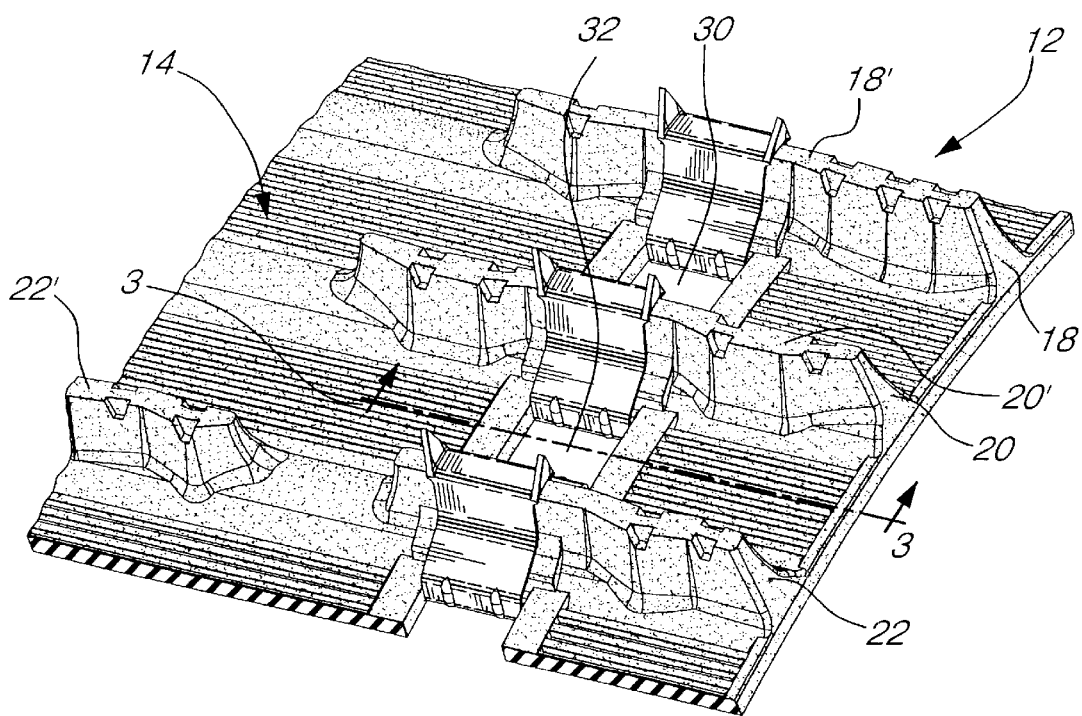
FIG. 2 is a top perspective view showing part of a snowmobile track equipped with clips such as shown in FIG. 1.

Referring to FIGS. 1 and 2, there is shown a metallic element, generally denoted 10, which is shaped to form part of a snowmobile endless track, generally denoted 12, made in accordance with the present invention.

Figure 3:
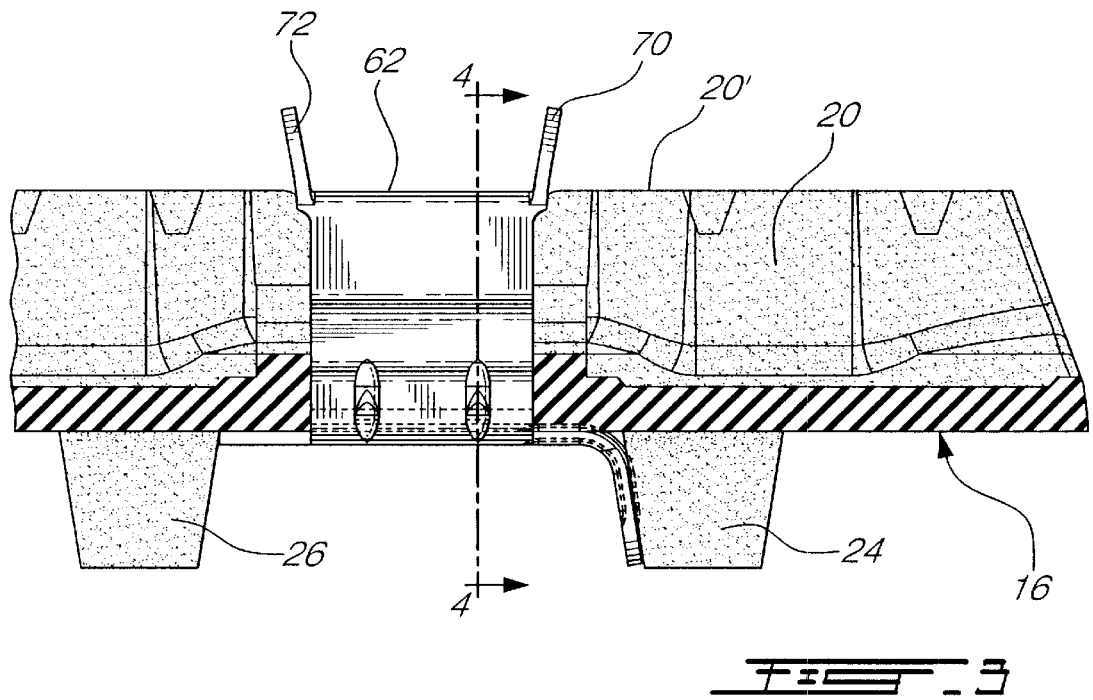
FIG. 3 is a cross-sectional view taken along line 3—3 of FIG. 2.
Figure 4:
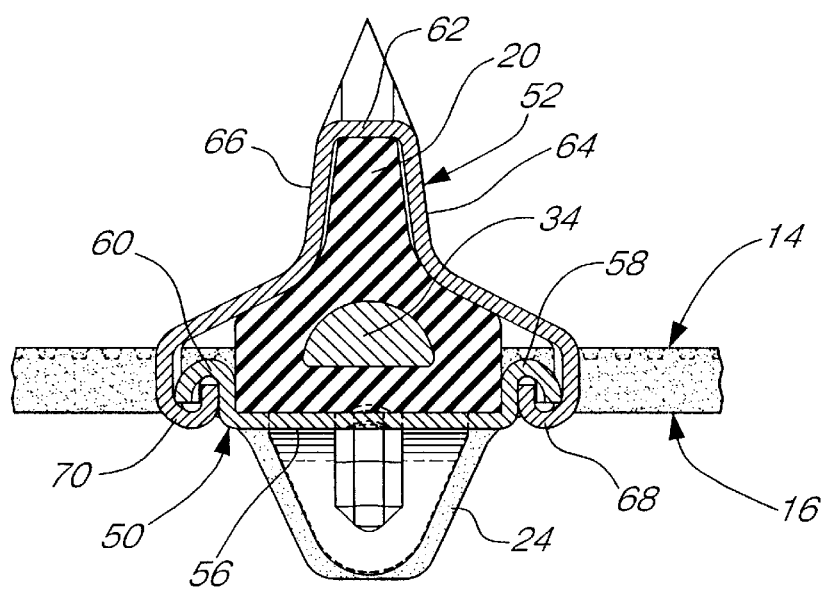
FIG. 4 is a cross-sectional view taken along line 4—4 of FIG. 3.

Referring also to FIGS. 3 and 4, the snowmobile track 12 comprises an outer surface 14 and an inner surface 16. The outer surface comprises a series of transverse rows, (three being shown as 18, 20 and 22) which are longitudinally spaced along the endless track. The profiles have different forms to provide ground traction to the track when driven by the transmission system of a snowmobile (not shown).

The inner face 16 of the track comprises a series of lugs, such as those illustrated as 24 and 26, which are adapted to be contacted by drive sprockets (not shown) forming part of the driving system of the snowmobile.

The suspension system of the snowmobile usually consists of a pair of longitudinal slide runners that bear on the lower run of the inner face 16 of the snowmobile track. They are usually located over areas of the track where a series of holes, such as 30 and 32, are provided.

On most snowmobile tracks, the metallic elements are clipped onto the rubber material that form part of the profiles. It is possible to have some tracks where the clips are present at every second, third or more profile. Reinforcing rods 34 usually extends transversally of the track within the profiles. The construction of a snowmobile track is well known and a detailed description of its method of manufacturing needs not be described. It should be mentioned however that, in one co-pending application of applicant, a new method of making a snowmobile track is described where the metallic elements are not clipped on the tracks after the track is vulcanized and cured, but where they are integrally formed to the track prior to the vulcanizing and curing steps.

In all known snowmobile tracks, the metallic elements, whether clipped or integrally formed, have a portion extending near the plane of the inner surface of the track and opposite wing portions that are clipped or integral with opposite sides of the profiles; however, they terminate short of the top edge thereof. The slide runners bear and slide along the outer face of the portions of the metallic elements that lie near the plane of the inner surface of the track. During use of the snowmobile, heat is generated at the contacting surfaces of the clips and the runners.

The present invention is concerned with having means for dissipating this heat from the slide runners to the ground, such as snow or ice, over which the snowmobile travels.

The embodiment illustrated in FIG. 1 consists of a two part clip which achieves the intended purpose of the present invention. The clip 10 comprises a first part 50 and a second part 52. As can be seen in FIG. 4, the first part 50 comprises a flat horizontal portion 56 and a pair of opposite hook portions 52 and 60.

The second part 52 comprises a top portion 62 that lies over the top edge of the profile 20 and opposite side portions 64 and 66 which follow generally the contour of the profile and which display lower hook portions 68 and 70. The latter are shaped to lockingly engage the hook portions 58 and 60 of the lower part 50 of the clip. The top portion 62 has opposite triangular shaped pointed ends 70 end 72 which extend beyond a plane that extends through the top edges 18', 20' and 22' of the profiles 18, 20 and 22.

The lower part 50 has a downwardly curved end portion 80 which is adapted to bear against the side face of the lug 24 on the inner surface of the track.

The parts 50 and 52 have, on opposite side thereof, one or more bosses 90, 92 that fittedly engage one another to further secure the engagement of the two parts when hooked to one another.

Referring to FIG. 4, it can be seen that the heat generated by the frictional contact of the slide runners on the surface 56 of the lower part 50 of the clip will be thermally transferred to the upper clip part 52 and to its pointed ends 70, 72 which will contact the ice or show on which bears the lower run of the snowmobile track during operation of the snowmobile.

Although the invention has been described in relation to one specific form, it will be evident to the person skilled in the art that it may be modified and refined in various ways.

It is therefore wished to have it understood that the present invention should not be limited in scope, except by the terms of the following claims.

What is claimed is:

1. A track for use on a snowmobile having a suspension system equipped with one or more elongated side runners, said track comprising an endless body having an outer surface with transverse ground engaging profiles spaced longitudinally thereof and an inner surface adapted to receive on the lower run thereof said slide runners of said suspension system:

said track including one or more rows of longitudinally spaced metal clips secured to said body of said track;

each said clip having a first portion extending substantially in the plane of said inner surface and so disposed thereon as to be frictionally contacted by this slide runner, and a second portion extending above said outer surface of said track so as to contact the ground over which said snowmobile travels;

said second portion having ends extending in a plane beyond the plane extending through top edges of the profiles of the track, whereby heat generated by the sliding track of said slide runners on said first portion of said clip is thermally transferred to the ground being of a temperature lower than that of the heat generated by the sliding friction of said slide runners on said clips.

2. A snowmobile as defined in claim 1, wherein said clips are metallic elements clipped to said profiles in openings of said track.

3. A track as defined in claim 1, wherein said clips are metallic elements integrally formed with the body of said track.

* * * * *